Jan. 30, 1968 D. HEYER 3,365,966
GEARED PULLEY AND BELT DRIVE
Filed July 15, 1965
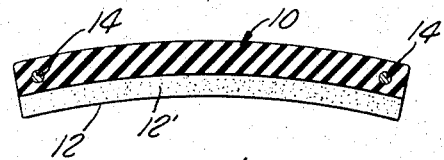
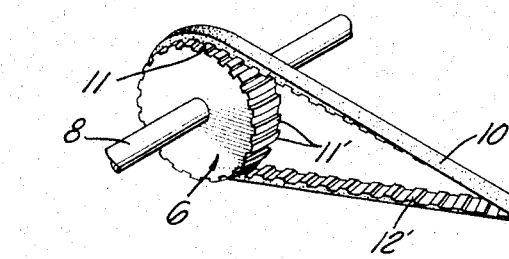
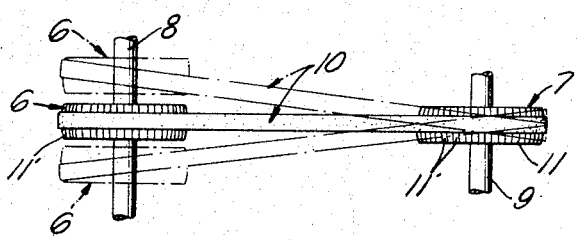
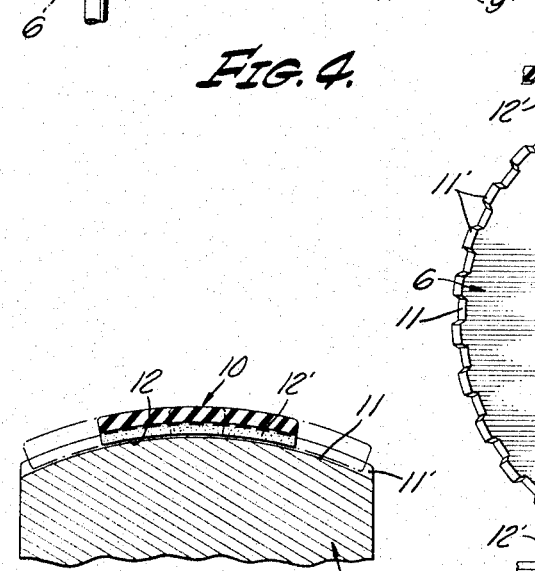
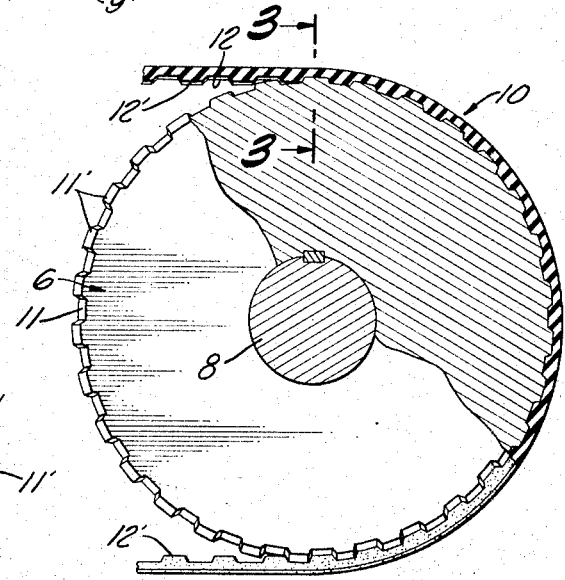
DON HEYER
INVENTOR.
BY Paul A. Weilein
ATTORNEY

United States Patent Office 3,365,966
Patented Jan. 30, 1968

3,365,966
GEARED PULLEY AND BELT DRIVE
Don Heyer, 1019 N. Raymond, Fullerton, Calif. 92631
Filed July 15, 1965, Ser. No. 472,214
3 Claims. (Cl. 74—229)

ABSTRACT OF THE DISCLOSURE

A belt having an inner surface of concave configuration in transverse cross section operatively interconnects two pulleys, the outer circumferential surfaces of which are convex in transverse cross section to match the inner configuration of the belt, the concave surface of the belt having uniformly spaced grooves forming teeth and the peripheral surfaces of the pulleys having matching transverse grooves and teeth. The belt is substantially narrower than the two pulleys to permit the belt to seek stable positions on the two pulleys without the necessity of equipping the pulleys with guide flanges to keep the belt from overhanging the sides of the pulleys. The belt is reinforced with embedded wire-like elements near its opposite longitudinal sides.

---

This invention relates to geared pulley and belt drives and has for an object the provision of an improved belt and pulley drive wherein geared portions of the pulleys and belt have especially formed mating surfaces which, without guide means other than the mating surfaces will cause the belt to center properly on the pulleys, and in case of one or more of the pulleys being operable on a vertical axis or out of alignment with another pulley, will cause the belt to remain in effective driving contact with the pulleys without undue wear of the pulleys or belt.

Another object of this invention is to provide drive means which will achieve the above noted objective by means of transversely crowned or convex belt engaging surfaces on the pulleys and a crowned belt providing a transversely concaved pulley engaging surface which will conform to the crowned or convex surfaces on the pulleys, there being gear teeth on the opposed surfaces of the pulleys and the belt which will effectively mesh in all operations of the drive means.

Another object of this invention is to provide a geared pulley and belt drive wherein in case of misalignment of the pulleys, the belt will remain in effective driving engagement with the pulleys without undue wear of pulleys or belt, by reason of the belt being of less width than that of the pulleys and in having its concave side conforming closely to the convex surfaces of the pulleys.

Another object of this invention is to provide a pulley and belt drive such as described wherein the convex surfaces of the pulleys and the concave surfaces of the belt will permit of angular disposition and proper driving relation of the belt on the pulleys if the latter are misaligned without requiring that the belt flex or stretch appreciably, and therefore the belt may be effectively reinforced with embedded wires of steel or other suitable metal and the resultant relative stiffness of the belt does not interfere with proper driving contact of the belt and pulley in all applications of the drive.

Other objects and advantages of the invention will be hereinafter described or will become apparent to those skilled in the art, and the novel features of the invention will be defined in the appended claims.

Referring to the drawings:

FIG. 1 is a perspective view of a geared pulley and belt drive embodying the present invention;

FIG. 2 is an enlarged sectional view of one of the pulleys and the belt, showing portions in side elevation;

FIG. 3 is a fragmentary sectional view taken on the line 3—3 of FIG. 2, showing in broken lines angular positions of the belt on the pulleys;

FIG. 4 is a plan view showing in broken lines how the belt remains on the pulleys when the pulleys are misaligned; and FIG. 5 is an enlarged cross sectional view of the belt.

As shown in the accompanying drawing a pulley and belt drive assembly embodying the present invention comprises pulley means including a pair of pulleys 6 and 7 mounted on shafts 8 and 9 and operatively connected by belt means including a belt 10. The pulleys may be mounted on horizontal and vertical axes respectively as here shown, with the belt crossing or both pulleys may be mounted on vertical or horizontal axes and in fact in any manner in which the belt will have driving contact with the pulleys.

The pulleys 6 and 7 are crowned so that each has a perimeter that is transversely convex and curved to provide a belt engaging surface 11. The belt 10 is correspondingly crowned so that it has a transversely curved and concave inner surface 12 corresponding to the curvature of the surfaces 11. The mated surfaces 11 and 12 are provided respectively with transverse grooves forming transverse gear teeth 11' and 12' which will mesh effectively whether the belt is squarely engaged with the pulleys or angularly extended over the pulleys. In this connection it should be noted that the belt 10 is of such less width than the surfaces 11 of the pulleys that if the pulleys are misaligned as shown in FIG. 4, the angular disposition of the belt thereon will not cause the belt to contact edges of the pulleys and thereby be subjected to wear or other damage, particularly as to the teeth on the belt and pulleys. In fact the mating curved surfaces 11 and 12 of the pulleys and belt make it possible to reinforce the belt for a long life by having wires 14 of steel or other suitable metal embedded therein. The relative rigidity of the belt as reinforced by the wires 14 does not interfere with the proper mating of the surfaces 11 and 12 and the proper meshing of the teeth 11' and 12' due to crown formations of the pulleys and belt.

A further advantage of making the belt substantially narrower than the two pulleys is that even if the pulleys are accurately aligned with each other a belt that is not symmetrically dimensioned will tend to seek off-center positions on the two pulleys and with the off-center positions the belt may still be in full contact with the two pulleys instead of overhanging a side edge of a pulley. It is exceedingly difficult to fabricate a belt that is precisely symmetrical in dimension because even if the belt is accurately molded, the step of curing or vulcanizing the material of the belt may cause nonuniform shrinkage or expansion of the belt.

With reference to the foregoing description and accompanying drawing, it will be apparent that a pulley and belt drive embodying the present invention constitutes an improvement in geared pulley and belt drives in that the belt will center properly on the pulleys without any guide means other than the convex surfaces of the crowned pulleys engaged with the concave surface of the crowned belt, and in that the belt will maintain an effective drive connection with the pulleys when the latter are misaligned, also in that the belt may be reinforced with wires which reduce the stretchability of the belt but do not interfere with the desired contact of belt and pulleys on all installations of the drive.

While specific structural details have been shown and described, it should be understood that changes and alterations may be resorted to without departing from the

I claim:

1. In a power transmission wherein a drive pulley is operatively connected to a driven pulley by a belt, the improvement to permit misalignment of the two pulleys and at the same time to prevent the belt from overhanging side edges of the peripheries of the two pulleys without the necessity of providing guide flanges on the two pulleys, comprising:

said pulleys having peripheral surfaces that are convex and rounded in transverse cross section to give the pulleys a smoothly curved crowned configuration to tend to cause the belt to seek centered positions on the two pulleys when the pulleys are aligned with each other and the belt is symmetrically dimensioned;

the periphery of each pulley being formed with transverse grooves and teeth;

the inner surface of the belt being of a curved concave transverse cross section complementary to the rounded convex transverse cross section of the peripheral surfaces of the pulleys and formed with transverse grooves and teeth to match the grooves and teeth of the pulleys for positive engagement therewith;

the outer surface of the belt being smoothly curved transversely and being uniformly spaced from the said inner surface thereof;

the belt being substantially narrower than the pulleys to permit the belt to seek off-centered positions relative to the two pulleys without overhanging the sides of the pulleys in the event that the two pulleys are out of mutual alignment or in the event that the belt is not symmetrically dimensioned.

2. A combination as set forth in claim 1 in which longitudinal wire-like reinforcement members are embedded in the material of the belt only near the opposite longitudinal edges of the belt to act in tension to oppose stretching of the opposite side marginal portions of the belt thereby to oppose flattening of the inner concave surface of the belt while permitting the belt to twist freely about its longitudinal axis.

3. In a power transmission wherein a drive pulley is operatively connected to a driven pulley by a belt, the improvement to permit misalignment of the two pulleys and at the same time to prevent the belt from overhanging side edges of the peripheries of the two pulleys without the necessity of providing guide flanges on the two pulleys, comprising:

said pulleys having peripheral surfaces that are convex and rounded in transverse cross section to give the pulleys a smoothly curved crowned configuration to tend to cause the belt to seek centered positions on the two pulleys when the pulleys are aligned with each other and the belt is symmetrically dimensioned;

the periphery of each pulley being formed with transverse grooves and teeth;

the inner surface of the belt being of a curved concave transverse cross section complementary to the rounded convex transverse cross section of the peripheral surfaces of the pulleys and formed with transverse grooves and teeth to match the grooves and teeth of the pulleys for positive engagement therewith;

the outer surface of the belt being smoothly curved transversely and being uniformly spaced from the said inner surface thereof;

said belt being made of elastomeric material;

and longitudinal wire-like reinforcement members being embedded in the elastomeric material only near the opposite longitudinal edges respectively of the belt to act in tension to oppose stretching of the opposite side marginal portions of the belt thereby to oppose flattening of the inner concave surface of the belt without unduly opposing twisting of the belt as required when the two pulleys rotate in mutually perpendicular planes.

References Cited

UNITED STATES PATENTS

| | | | |
|---|---|---|---|
| 1,285,465 | 11/1918 | Tewksbury | 74—237 X |
| 1,999,012 | 4/1935 | Woodford | 74—219 |
| 1,999,674 | 4/1935 | White | 74—219 |
| 2,197,884 | 4/1940 | Ackerman et al. | 74—219 |
| 2,838,946 | 6/1958 | Kiekhaefer | 74—229 |
| 3,068,710 | 12/1962 | Beckadolph et al. | 74—229 |

FOREIGN PATENTS

| | | |
|---|---|---|
| 578,540 | 6/1959 | Canada. |
| 962,956 | 7/1964 | Great Britain. |

OTHER REFERENCES

IBM Technical Disclosure Bulletin, Precision Timing Belt, R. G. Maples, vol. 6, No. 6, November 1963.

FRED C. MATTERN, JR., *Primary Examiner.*

J. A. WONG, *Assistant Examiner.*